US012630166B2

(12) United States Patent
Sato et al.

(10) Patent No.: US 12,630,166 B2
(45) Date of Patent: May 19, 2026

(54) VEHICLE DRIVE ASSIST APPARATUS AND VEHICLE

(71) Applicant: SUBARU CORPORATION, Tokyo (JP)

(72) Inventors: Fumiya Sato, Tokyo (JP); Tomohiro Abe, Tokyo (JP); Mika Suzuki, Tokyo (JP); Hiroki Marumo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 235 days.

(21) Appl. No.: 18/116,630

(22) Filed: Mar. 2, 2023

(65) Prior Publication Data

US 2023/0294714 A1     Sep. 21, 2023

(30) Foreign Application Priority Data

Mar. 17, 2022    (JP) ................................. 2022-042681

(51) Int. Cl.
*B60W 50/00*          (2006.01)
*B60W 40/068*        (2012.01)
                (Continued)

(52) U.S. Cl.
CPC ...... *B60W 50/0098* (2013.01); *B60W 40/068* (2013.01); *B60W 40/08* (2013.01);
                (Continued)

(58) Field of Classification Search
CPC .. B60W 60/0059; B60W 30/04; B60W 50/14; B60W 60/0057; B60W 40/068;
                (Continued)

(56) References Cited

U.S. PATENT DOCUMENTS

2008/0167757 A1*  7/2008  Kanevsky .............. G07C 5/085
                                                                701/1
2013/0018549 A1*  1/2013  Kobana .................. B60K 28/06
                                                                701/41
(Continued)

FOREIGN PATENT DOCUMENTS

JP              7-306998 A      11/1995
JP          2004-138549 A       5/2004
                (Continued)

OTHER PUBLICATIONS

Office Action issued in Japanese Patent Application No. 2022-042681 dated Oct. 14, 2025 (including English translation).

*Primary Examiner* — Minnah L Seoh
(74) *Attorney, Agent, or Firm* — TROUTMAN PEPPER LOCKE LLP

(57)               ABSTRACT

A vehicle drive assist apparatus includes one or more processors and one or more memories. The one or more memories are communicably coupled to the one or more processors. The one or more processors are configured to acquire road condition information of a road where a vehicle is traveling, drive skill information of a driver who drives the vehicle, and drive assist necessity information of the vehicle. The one or more processors are configured to determine which of preset road condition categories applies based on the acquired road condition information. The one or more processors are configured to determine which of preset drive skill categories applies based on the acquired drive skill information. The one or more processors are configured to execute, based on the acquired drive assist necessity information, a drive assist process for the vehicle depending on the determined road condition category and the determined drive skill category.

6 Claims, 10 Drawing Sheets

(51) Int. Cl.
    *B60W 40/08*         (2012.01)
    *B60W 50/10*         (2012.01)

(52) U.S. Cl.
    CPC ..... *B60W 50/10* (2013.01); *B60W 2040/0818*
        (2013.01); *B60W 2540/229* (2020.02); *B60W*
        *2552/40* (2020.02); *B60W 2555/20* (2020.02);
        *B60W 2710/0666* (2013.01)

(58) Field of Classification Search
    CPC ..... B60W 60/0053; B60W 2050/0072; B60W
        2555/20; B60W 2552/40; B60W
        2050/143; B60W 2556/45; B60W
        2552/35; B60W 2050/0075; B60W
        2556/10
    See application file for complete search history.

(56)         References Cited

U.S. PATENT DOCUMENTS

2015/0336587 A1   11/2015  Inoue et al.
2016/0355190 A1*  12/2016  Omi ...................... G08B 21/06

2018/0004205 A1    1/2018  Matsunaga et al.
2018/0178807 A1    6/2018  Murata
2018/0348759 A1*  12/2018  Freeman .............. A61N 1/3904
2020/0307645 A1   10/2020  Yamasaki et al.
2021/0370956 A1*  12/2021  Yamauchi et al. .... B60W 40/08
2023/0294720 A1*   9/2023  Suzuki et al. .... B60W 60/0051
                            701/24

FOREIGN PATENT DOCUMENTS

| | | | |
|---|---|---|---|
| JP | 2006-46936 | A | 2/2006 |
| JP | 2007-263242 | A | 10/2007 |
| JP | 2007-271961 | A | 10/2007 |
| JP | 2007-313927 | A | 12/2007 |
| JP | 2010-69983 | A | 4/2010 |
| JP | 2015-38516 | A | 2/2015 |
| JP | 2015-219830 | A | 12/2015 |
| JP | 2017-136922 | A | 8/2017 |
| JP | 2018-005567 | A | 1/2018 |
| JP | 2018-106530 | A | 7/2018 |
| JP | 2019-189069 | A | 10/2019 |
| JP | 2020-157988 | A | 10/2020 |

* cited by examiner

ROAD CONDITION CATEGORY: DRY

| | | FRICTION COEFFICIENT (μ) | | | | | |
|---|---|---|---|---|---|---|---|
| VEHICLE SPEED | | LESS THAN 50 km/h | | | 50 km/h OR MORE | | |
| DRIVE SKILL | | LOW | MEDIUM | HIGH | LOW | MEDIUM | HIGH |
| ASPHALT | NEW PAVEMENT | 0.80 | 0.90 | 1.00 | 0.65 | 0.68 | 0.70 |
| | NORMAL PAVEMENT | 0.60 | 0.70 | 0.80 | 0.55 | 0.63 | 0.70 |
| | PAVEMENT FRICTION | 0.55 | 0.65 | 0.75 | 0.45 | 0.55 | 0.65 |
| | EXCESSIVE TAR | 0.50 | 0.55 | 0.60 | 0.35 | 0.53 | 0.6 |
| CONCRETE | NEW PAVEMENT | 0.80 | 0.90 | 1.00 | 0.7 | 0.77 | 0.85 |
| | NORMAL PAVEMENT | 0.60 | 0.70 | 0.80 | 0.6 | 0.68 | 0.75 |
| | PAVEMENT FRICTION | 0.55 | 0.65 | 0.75 | 0.5 | 0.58 | 0.65 |
| GRAVEL | SIMPLE PAVEMENT | 0.55 | 0.70 | 0.85 | 0.5 | 0.65 | 0.8 |
| | FINE GRAVEL | 0.44 | 0.57 | 0.70 | 0.4 | 0.55 | 0.7 |

FIG. 5A

| | NORMAL CASE | | | CASE OF PRIORITY SKILL VALUE | | |
|---|---|---|---|---|---|---|
| ACCELERATOR SKILL VALUE (A) | 90% OR MORE — HIGH | 80% OR MORE AND LESS THAN 90% — MEDIUM | LESS THAN 80% — LOW | 98% OR MORE — HIGH | 90% OR MORE AND LESS THAN 98% — MEDIUM | LESS THAN 90% — LOW |
| STEERING WHEEL OPERATION SKILL VALUE (B) | 90% OR MORE — HIGH | 80% OR MORE AND LESS THAN 90% — MEDIUM | LESS THAN 80% — LOW | 98% OR MORE — HIGH | 90% OR MORE AND LESS THAN 98% — MEDIUM | LESS THAN 90% — LOW |
| BRAKE SKILL VALUE (C) | 90% OR MORE — HIGH | 80% OR MORE AND LESS THAN 90% — MEDIUM | LESS THAN 80% — LOW | 98% OR MORE — HIGH | 90% OR MORE AND LESS THAN 98% — MEDIUM | LESS THAN 90% — LOW |

TOTAL SKILL VALUE
ALL OF A, B, AND C ARE "HIGH" → TOTAL DETERMINATION "HIGH"
TWO OR MORE OF A, B, AND C ARE "HIGH" → TOTAL DETERMINATION "MEDIUM"
TWO OR MORE OF A, B, AND C ARE "MEDIUM" OR "LOW" → TOTAL DETERMINATION "LOW"

FIG. 5B (i)

| | PRIORITY SKILL VALUE |
|---|---|
| DRY | NONE |
| WET | BRAKE SKILL VALUE (C) |
| ICE | STEERING WHEEL OPERATION SKILL VALUE (B) |
| SNOW | ACCELERATOR SKILL VALUE (A) |

(ii)

| FRICTION COEFFICIENT | PRIORITY SKILL VALUE |
|---|---|
| 0.8 – | NONE |
| 0.8 – 0.6 | BRAKE SKILL VALUE (C) |
| 0.6 – 0.4 | STEERING WHEEL OPERATION SKILL VALUE (B) |
| – 0.4 | ACCELERATOR SKILL VALUE (A) |

FIG. 7

| ROAD CONDITION DETERMINATION | DRIVE SKILL DETERMINATION | | |
|---|---|---|---|
| | HIGH | MEDIUM | LOW |
| DRY | 90% | 85% | 80% |
| WET | 80% | 75% | 70% |
| SNOW | 80% | 70% | 60% |
| ICE | 70% | 60% | 50% |

VEHICLE DRIVE ASSIST APPARATUS AND VEHICLE

CROSS-REFERENCE TO RELATED APPLICATION

The present application claims priority from Japanese Patent Application No. 2022-042681 filed on Mar. 17, 2022, the entire contents of which are hereby incorporated by reference.

BACKGROUND

The disclosure relates to a vehicle drive assist apparatus and a vehicle.

For example, Japanese Unexamined Patent Application Publication (JP-A) No. 2019-189069 discloses an apparatus that performs appropriate vehicle control depending on a road friction coefficient and a drive characteristic of a driver who drives a vehicle. Japanese Unexamined Patent Application Publication (JP-A) No. 2007-313927 discloses a technology for controlling a vehicle driving force in agreement with a driver based on a traveling environment parameter related to a position where the vehicle is traveling. Japanese Unexamined Patent Application Publication (JP-A) No. 2007-263242 discloses a control apparatus that increases a driving force of a vehicle when various conditions such as a road condition and a driver's awareness level are suited to execution of control for increasing the driving force of the vehicle. Japanese Unexamined Patent Application Publication (JP-A) No. 2010-69983 discloses a technology for decelerating a vehicle by stopping application of a steering assist force based on a lateral deviation of the vehicle from a target traveling position in response to determination that the driver's awareness level has decreased. Japanese Unexamined Patent Application Publication (JP-A) No. 2017-136922 discloses a vehicle control technology for reducing a vehicle speed in response to detection of fear for a driver or passenger of the vehicle. Japanese Unexamined Patent Application Publication (JP-A) No. H7-306998 discloses a technology for controlling a vehicle by receiving a steering angle, a lateral acceleration of the vehicle, and a slip between tires and a road and determining the driver's skill at three levels that are low, medium, and high levels.

SUMMARY

An aspect of the disclosure provides a vehicle drive assist apparatus including one or more processors and one or more memories. The one or more memories are communicably coupled to the one or more processors. The one or more processors are configured to acquire road condition information of a road where a vehicle is traveling, drive skill information of a driver who drives the vehicle, and drive assist necessity information of the vehicle. The one or more processors are configured to determine which of preset road condition categories applies based on the acquired road condition information. The one or more processors are configured to determine which of preset drive skill categories applies based on the acquired drive skill information. The one or more processors are configured to execute, based on the acquired drive assist necessity information, a drive assist process for the vehicle depending on the determined road condition category and the determined drive skill category.

An aspect of the disclosure provides a vehicle including a road condition detector, a drive skill detector, and the vehicle drive assist apparatus described above. The road condition detector is configured to detect a condition of a road where the vehicle is traveling. The drive skill detector is configured to detect a drive skill of a driver who drives the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 is a block diagram illustrating an example of the configurations of the vehicle drive assist apparatus and its peripheral devices according to the embodiment;

FIG. 4 illustrates an example of a database for road condition determination according to the embodiment;

FIG. 5A is a schematic diagram for drive skill category determination according to the embodiment;

FIG. 5B is a schematic diagram for priority skill value determination according to the embodiment;

FIG. 7 illustrates an example of a database related to details of drive assist according to the embodiment;

DETAILED DESCRIPTION

The technologies of JP-A Nos. 2019-189069, 2007-313927, 2007-263242, 2010-69983, 2017-136922, and H7-306998 have a possibility that the market needs are not met appropriately and have room for improvement in the following matter.

The drive skill and the drive characteristic differ among drivers of vehicles. Even if the vehicle is controlled based on the road friction coefficient and the drive skill as in the related art, there may be difficulty in achieving appropriate vehicle control depending on the difference in the drive characteristic among the drivers.

It is desirable to provide a vehicle drive assist apparatus that performs more appropriate drive assist depending on a road condition and a drive characteristic and a drive skill of a driver.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Regarding configurations other than those described in detail below, known vehicle structures and on-board systems including various known on-board sensors may be employed as appropriate.

Figure 1:
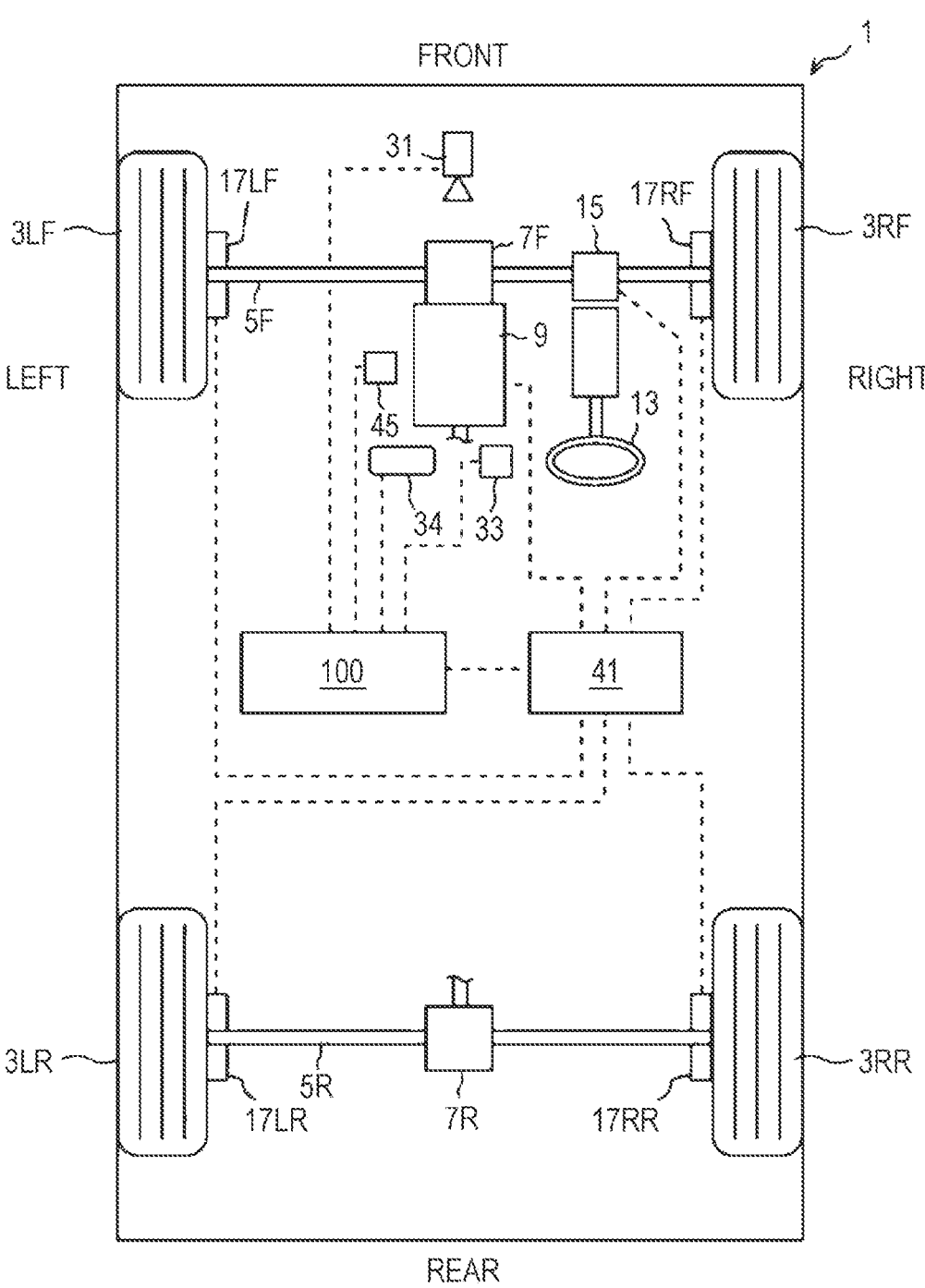
FIG. 1 is a block diagram illustrating an example of the configuration of a vehicle including a vehicle drive assist apparatus according to an embodiment.

FIG. 1 illustrates an example of the configuration of a vehicle 1 of this embodiment. Examples of the vehicle of this embodiment include a four-wheel drive automobile. Any automobile other than the four-wheeled automobile, such as a two-wheeled automobile, may be employed without departing from the gist of the embodiment of the disclosure.

FIG. 1 is a schematic diagram illustrating an example of the configuration of the vehicle 1 including a vehicle drive assist apparatus 100 according to this embodiment. In FIG. 1, the vehicle 1 is a four-wheel drive vehicle that transmits a vehicle driving torque generated by and output from a driving source 9 to a right front wheel 3RF, a left front wheel 3LF, a right rear wheel 3RR, and a left rear wheel 3LR (hereinafter referred to collectively as "wheels 3" unless otherwise distinguished). The driving source 9 may be an internal combustion engine such as a gasoline engine or a diesel engine, a driving motor, or a combination of the internal combustion engine and the driving motor.

For example, the vehicle 1 may be a battery electric vehicle including two driving motors that are a front wheel driving motor and a rear wheel driving motor, or a battery electric vehicle including driving motors for the respective wheels 3. In a case where the vehicle 1 is a battery electric vehicle or a hybrid electric vehicle, the vehicle 1 includes a secondary battery that stores electric power to be supplied to the driving motors, and a generator such as a motor or a fuel cell that generates electric power for charging the battery.

The vehicle 1 includes the driving source 9, an electric steering device 15, and a brake fluid pressure control unit 20 as devices for use in vehicle drive control. The driving source 9 outputs the driving torque to be transmitted to a front wheel drive shaft 5F and a rear wheel drive shaft 5R via a transmission (not illustrated), a front wheel differential mechanism 7F, and a rear wheel differential mechanism 7R. The driving of the driving source 9 and the transmission is controlled by a vehicle control device 41 including one or more electronic control units (ECUs).

The electric steering device 15 is provided to the front wheel drive shaft 5F. The electric steering device 15 includes an electric motor and a gear mechanism (not illustrated) and is controlled by the vehicle control device 41 to adjust steering angles of the right front wheel 3RF and the left front wheel 3LF. During manual driving, the vehicle control device 41 controls the electric steering device 15 based on a steering angle of a steering wheel 13 operated by a driver.

The vehicle 1 includes a hydraulic brake system. The brake fluid pressure control unit 20 generates a braking force by adjusting hydraulic pressures to be supplied to brake calipers 17RF, 17LF, 17RR, and 17LR (hereinafter referred to collectively as "brake calipers 17" unless otherwise distinguished) provided to the right and left front and rear driving wheels 3RF, 3LF, 3RR, and 3LR. The driving of the brake fluid pressure control unit 20 is controlled by the vehicle control device 41. In the case where the vehicle 1 is a battery electric vehicle or a hybrid electric vehicle, the brake fluid pressure control unit 20 is used in combination with regenerative brakes using the driving motors.

The vehicle control device 41 includes one or more electronic control units that control the driving of the driving source 9 that outputs the driving torque of the vehicle 1, the electric steering device 15 that controls the steering angle of the steering wheel 13 or steered wheels, and the brake fluid pressure control unit 20 that controls the braking force of the vehicle 1. The vehicle control device 41 may control the driving of the transmission that varies power output from the driving source 9 and transmits the power to the wheels 3. The vehicle control device 41 can acquire information from the vehicle drive assist apparatus 100 described later, and execute vehicle control based on a driving force upper limit value from the vehicle drive assist apparatus 100.

The vehicle 1 may include a surrounding environment sensor 31, an occupant monitoring sensor 33, a biometric sensor 34, a vehicle condition sensor 35, a global positioning system (GPS) sensor 37, a vehicle-to-vehicle communicator 39, a navigation device 40, and a human-machine interface (HMI) 43.

As described later, the surrounding environment sensor 31 includes a road temperature sensor that detects a temperature of a road, an irregularity sensor that detects irregularities of the road, and a water amount sensor that detects a water amount of the road. Examples of the road temperature sensor include various known temperature sensors as described in Japanese Unexamined Patent Application Publication No. 2015-038516. Examples of the irregularity sensor include a device disclosed in Japanese Unexamined Patent Application Publication No. 2004-138549 (road irregularity sensor), various known devices described in Japanese Unexamined Patent Application Publication No. 2013-61690, and a laser rangefinder. Examples of the water amount sensor include various known water amount sensors as described in Japanese Unexamined Patent Application Publication No. 2006-46936.

The surrounding environment sensor 31 of this embodiment may include front view cameras 31RF and 31LF, a rear view camera 31R, and a light detection and ranging (LiDAR) sensor 31S.

The front view cameras 31RF and 31LF, the rear view camera 31R, and the LiDAR sensor 31S constitute the surrounding environment sensor that acquires information on an environment around the vehicle 1. The front view cameras 31RF and 31LF and the rear view camera 31R generate image data by capturing images of areas ahead of or behind the vehicle 1. The front view cameras 31RF and 31LF and the rear view camera 31R each include an imaging element such as a charged-coupled device (CCD) or a complementary metal-oxide-semiconductor (CMOS), and can transmit the generated image data to the vehicle drive assist apparatus 100.

In the vehicle 1 illustrated in FIG. 1, the front view cameras 31RF and 31LF serve as a stereo camera including a pair of right and left cameras, and the rear view camera 31R is a so-called monocular camera. Each camera may be either one of the stereo camera and the monocular camera. In addition to the front view cameras 31RF and 31LF and the rear view camera 31R, the vehicle 1 may include, for example, known cameras that are provided to side mirrors and capture images of right and left rear areas.

The LiDAR sensor 31S transmits light, receives the reflected light, and detects an object and a distance to the object based on a period from the light transmission to the reflected light reception. The LiDAR sensor 31S can transmit detection data to the vehicle drive assist apparatus 100. In the vehicle 1, the surrounding environment sensor 31 that acquires information on the surrounding environment may include, in place of or in combination with the LiDAR sensor 31S, one or more known sensors out of an ultrasonic sensor and a radar sensor such as a millimeter wave radar.

The occupant monitoring sensor 33 may include a cabin camera 33c.

The cabin camera 33c includes one or more known sensors that detect information on occupants of the vehicle 1. The cabin camera 33c includes an imaging element such as a CCD or a CMOS, and generates image data by capturing an image of a cabin. The cabin camera 33c can transmit the generated image data to the vehicle drive assist apparatus 100. In this embodiment, the cabin camera 33c can capture an image of the driver of the vehicle 1. One or more cabin cameras 33c may be disposed.

The bioetric sensor 34 can detect biometric information of the occupants of the vehicle 1 and transmit detection data to the vehicle drive assist apparatus 100. Various known sensors may be employed as the biometric sensor 34. Examples of the sensors include an electric wave Doppler sensor that detects the heart rate of the occupant, and a non-wearable pulse rate sensor that detects the pulse rate of the occupant. The biometric sensor 34 may be a set of electrodes embedded in the steering wheel 13 to measure the heart rate or obtain an electrocardiogram of the driver of the vehicle 1.

The vehicle condition sensor 35 includes one or more known sensors that detect operating conditions and behaviors of the vehicle 1. For example, the vehicle condition sensor 35 includes one or more of a known steering angle sensor, a known accelerator position sensor, a known brake stroke sensor, a known brake pressure sensor, and a known engine speed sensor to detect operating conditions of the vehicle 1, such as a steering angle of the steering wheel 13 or the steered wheels, an accelerator operation amount, a brake operation amount, and an engine speed. For example, the vehicle condition sensor 35 includes one or more of a known vehicle speed sensor, a known acceleration sensor, and a known angular velocity sensor to detect behaviors of the vehicle, such as a vehicle speed, a longitudinal acceleration, a lateral acceleration, and a yaw rate. The vehicle condition sensor 35 includes a known sensor that detects an operation on a direction indicator to detect an operating condition of the direction indicator. The vehicle condition sensor 35 includes a known sensor such as a gyro sensor that detects inclination of the vehicle 1 to detect inclination of a road. The vehicle condition sensor 35 can transmit a sensor signal including the detected information to the vehicle drive assist apparatus 100.

The vehicle-to-vehicle communicator 39 is an interface for communication with vehicles traveling around the vehicle 1 (hereinafter referred to also as "other vehicles").

The navigation device 40 is a known navigation device that sets a traveling route to a destination set by the occupant and notifies the driver about the traveling route. The navigation device 40 is coupled to the GPS sensor 37, and acquires positional information of the vehicle 1 on map data by receiving satellite signals from GPS satellites via the GPS sensor 37. An antenna that receives a satellite signal from another satellite system that determines the position of the vehicle 1 may be used in place of the GPS sensor 37.

The HMI 43 is driven by the vehicle drive assist apparatus 100, and presents various types of information to the occupant by displaying an image or outputting voice and sound. For example, the HMI 43 includes a display provided in an instrument panel, and a loudspeaker provided in the vehicle. The display may serve as a display of the navigation device 40. The HMI 43 may include a head-up display that displays images on a windshield of the vehicle 1.

An example of the configuration of the vehicle drive assist apparatus 100 of the vehicle 1 according to this embodiment is described in detail. The vehicle drive assist apparatus 100 of this embodiment performs drive assist for the vehicle 1 depending on a road condition and a drive characteristic and a drive skill of the driver.

Figure 2:
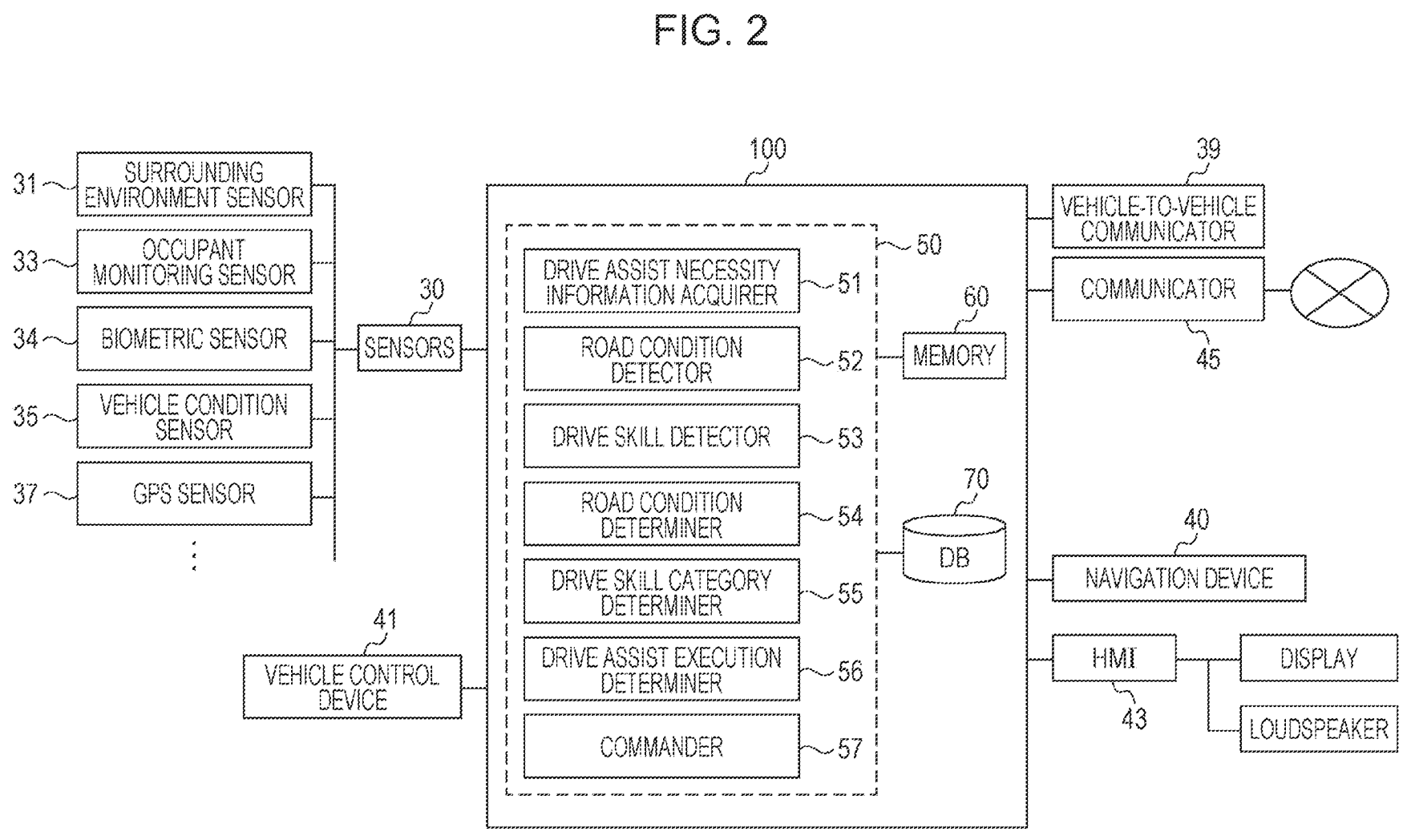

FIG. 2 is a block diagram illustrating an example of the configuration of the vehicle drive assist apparatus 100 according to this embodiment.

Sensors 30 (surrounding environment sensor 31, occupant monitoring sensor 33, biometric sensor 34, vehicle condition sensor 35, and GPS sensor 37) are coupled to the vehicle drive assist apparatus 100 via dedicated lines or a communicator such as a controller area network (CAN) or a local internet (LIN). The vehicle-to-vehicle communicator 39, the navigation device 40, the vehicle control device 41, and the HMI 43 are coupled to the vehicle drive assist apparatus 100 via dedicated lines or the communicator such as the CAN or the LIN. The vehicle drive assist apparatus 100 can be coupled to an external network NET such as the Internet via a known communicator 45. The vehicle drive assist apparatus 100 is not limited to an electronic control unit mounted on the vehicle 1, but may be a terminal device such as a smartphone or a wearable device.

The vehicle drive assist apparatus 100 of this embodiment includes a controller 50 and a known storage (memory 60 and database 70). The controller 50 includes one or more processors such as a central processing unit (CPU). The controller 50 may partially or entirely be configured by firmware or other updatable elements, or may be a program module to be executed by a command from the CPU or the like. The memory 60 of the storage is a known memory device such as a random access memory (RAM) or a read only memory (ROM).

The database 70 of the storage is a known updatable recording medium such as a solid state drive (SSD), a hard disk drive (HDD), a USB flash memory, or a storage device. In this embodiment, the number of storages and the type of the storage are not particularly limited. The storage of this embodiment may store computer programs to be executed by the controller 50 and information such as various parameters for use in arithmetic processing, detection data, and calculation results.

The database 70 of this embodiment may include road condition categories for individual road conditions. For example, the database 70 includes road condition categories 71 for individual road conditions (ICE, SNOW, DRY, WET), drive skill categories 72 for individual drive skills of the driver (HIGH, MEDIUM, LOW), and a friction coefficient database 73 associated with the road conditions (ICE, SNOW, DRY, WET) and the drive skills (HIGH, MEDIUM, LOW).

The database 70 may be installed in the vehicle 1, or at least a part of the database 70 may be stored in an external server communicable with the vehicle drive assist apparatus 100 by wireless communication such as mobile communication. The database 70 may be a single database or may include different databases for individual road conditions or drive skills.

As illustrated in FIG. 2, the controller 50 of the vehicle drive assist apparatus 100 includes a drive assist necessity information acquirer 51, a road condition detector 52, a drive skill detector 53, a road condition determiner 54, a drive skill category determiner 55, a drive assist execution determiner 56, and a commander 57.

The drive assist necessity information acquirer 51 acquires information as to whether the drive assist for the vehicle 1 is necessary. For example, the drive assist necessity information acquirer 51 can acquire intention information as to whether the driver of the vehicle 1 permits the drive assist by the vehicle drive assist apparatus 100, and information as to whether the traveling vehicle 1 is performing dangerous drive (dangerous drive information).

The intention information is generated when the driver inputs the driver's intention on the display or by voice before or after the start of drive of the vehicle 1. The drive assist necessity information acquirer 51 acquires the generated information via the communicator such as the CAN or the LIN.

Figure 6:
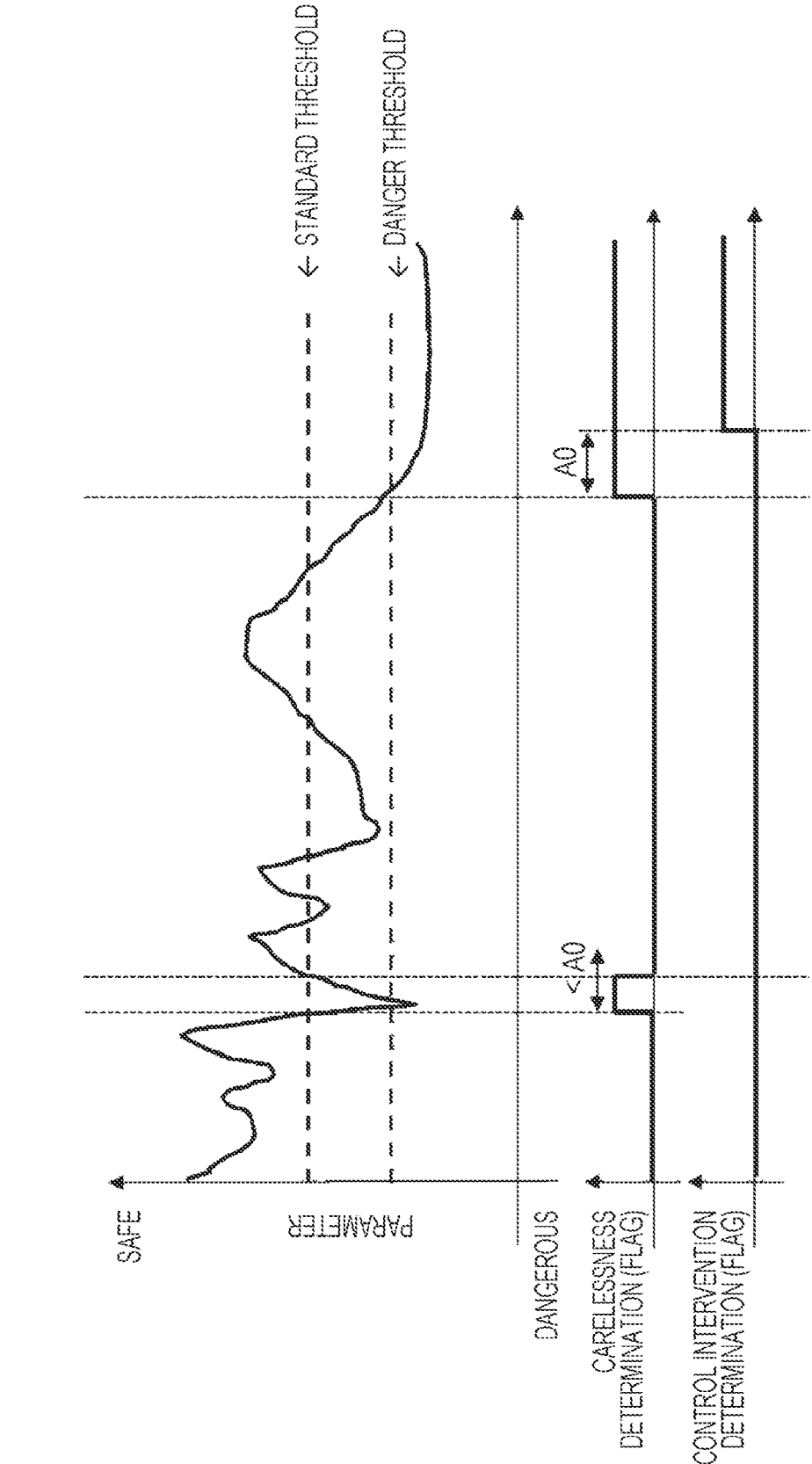
FIG. 6 is an exemplary time chart for acquisition of dangerous drive information according to the embodiment.

For example, the dangerous drive information is generated based on the states of the occupants in the vehicle 1. The dangerous drive information is generated based on, for example, information on an awareness level of the driver who is driving the vehicle 1, and information on a fear level of a passenger of the vehicle 1 about the drive performed by the driver. For example, the information on the driver's awareness level can be acquired by causing the cabin camera 33c to capture an image of the drive performed by the driver. For example, the information on the passenger's fear level can be acquired by causing the electric wave Doppler sensor to detect the heart rate of the passenger. As illustrated in FIG. 6, the drive assist necessity information acquirer 51 may acquire the dangerous drive information generated when a predetermined period or longer has elapsed after the parameter of the driver's awareness level or the passenger's fear level falls below a danger threshold.

The road condition detector 52 detects information on conditions of a road where the vehicle 1 is traveling. For example, the road condition detector 52 can detect the information on the conditions of the road where the vehicle 1 is traveling, that is, a road temperature, road irregularities, and a road water amount by using the road temperature sensor, the road irregularity sensor, and the road water amount sensor.

The drive skill detector 53 detects information on the drive skill of the driver of the vehicle 1. For example, the drive skill detector 53 can measure a traveling period of the vehicle 1 driven by the driver from any start point to any end point, an accelerator operation amount, a vehicle speed, a starting vehicle speed, a brake depression force, a steering angle, a period to a braking point, deceleration stability, a frequency of steering correction, an integral of changes in the vehicle-to-vehicle distance obtained by vehicle-to-vehicle communication, a separation distance of the vehicle from a lane line that is obtained by a CCD camera, and other change amounts.

For example, the drive skill detector 53 can acquire values of a traveling skill, a turning skill, and a stopping skill by using a method disclosed in Japanese Unexamined Patent Application Publication No. 2007-271961. That is, the drive skill detector 53 can detect, as the information on the drive skill of the driver of the vehicle 1, an accelerator skill value (A) indicating an accelerator depression skill, a steering wheel operation skill value (B) indicating a steering wheel operation skill of the driver of the vehicle at a curve, and a brake skill value (C) indicating a vehicle brake depression skill of the driver during braking of the vehicle.

The road condition determiner 54 determines which of the road condition categories in the database 70 applies based on the road condition information acquired by the road condition detector 52. For example, this determination can be made by a determination method described in Japanese Unexamined Patent Application Publication No. 2020-157988. For example, the road condition categories 71 in the database 70 are four categories "ICE", "SNOW", "DRY", and "WET", and pieces of information on road temperatures, road irregularities, road water amounts, and friction coefficients are specified in association with the respective road conditions. The road condition determiner 54 determines which of "ICE", "SNOW", "DRY", and "WET" applies to the road where the vehicle 1 is traveling by checking the road condition information acquired by the road condition detector 52 (road temperature, road irregularities, road water amount) against the road condition categories 71.

Figure 3:
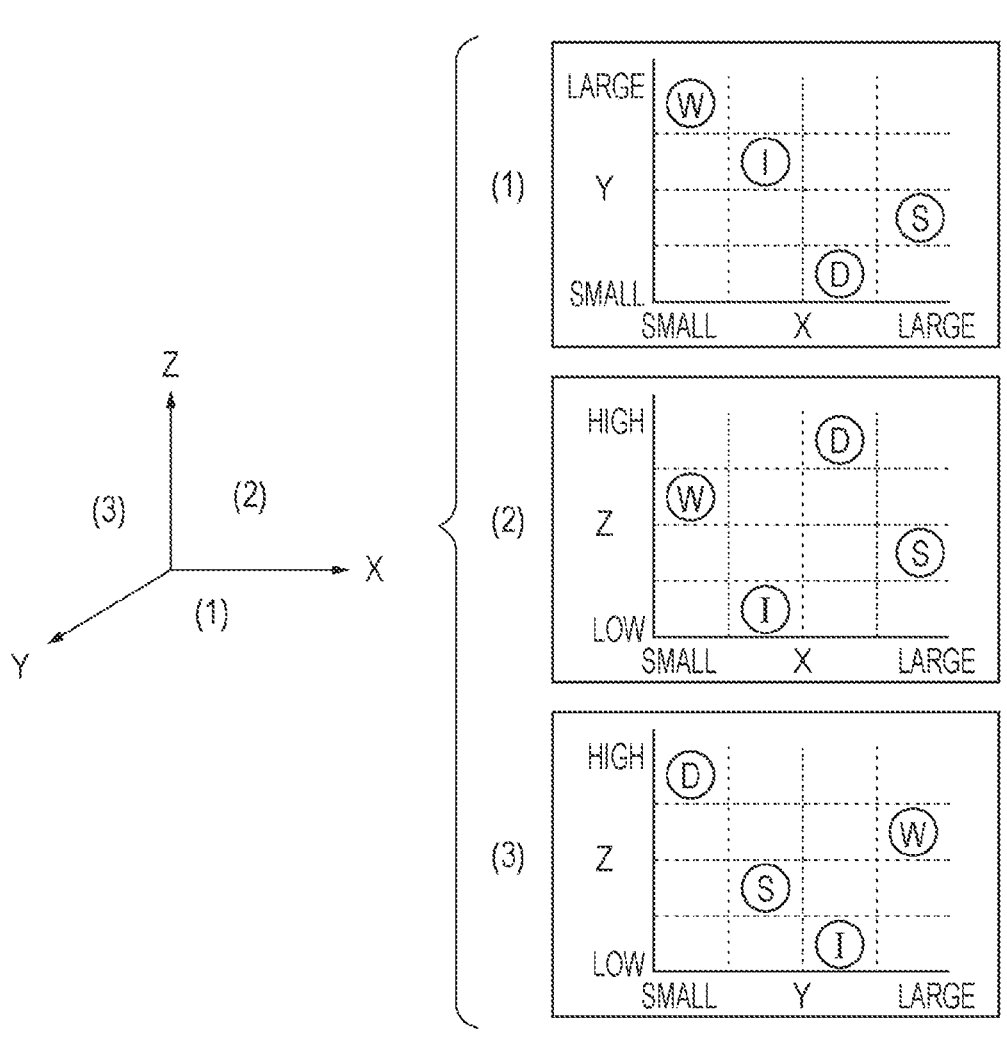
FIG. 3 is a schematic diagram illustrating matrix data on a road temperature, road irregularities, and a road water amount according to the embodiment.

That is, the road condition determiner 54 determines which of the four conditions (DRY, WET, SNOW, ICE) applies to the traveling road condition (type) based on a relationship (matrix data) among the road temperature, the road irregularities, and the road water amount obtained as a matrix in advance as illustrated in FIG. 3. Thus, the road condition determiner 54 can determine the road condition based on the data on the road temperature, the road irregularities, and the road water amount actually measured by the sensors by referring to the matrix data.

Although the road condition determiner 54 of this embodiment determines the road condition based on the road temperature, the road irregularities, and the road water amount, the determination method is not limited thereto. For example, a known determination technology using image analysis may be employed for the determination on the four road conditions without departing from the gist of this embodiment. In place of the four conditions (DRY, WET, SNOW, ICE), other known road conditions may be employed for the determination on the road condition. For example, the road condition determiner 54 may use a friction coefficient database based on road types (asphalt, concrete, gravel) and pavement types (simple pavement, normal pavement, excessive tar) as illustrated in FIG. 4, thereby determining a friction coefficient of the road where the vehicle 1 is traveling.

The drive skill category determiner 55 determines which of three drive skill categories "HIGH", "MEDIUM", and "LOW" applies by referring to a skill determination database in the database 70 based on the information on the drive skill of the driver of the vehicle 1 that is acquired by the drive skill detector 53. For example, the accelerator skill value (A), the steering wheel operation skill value (B), and the brake skill value (C) acquired by the drive skill detector 53 are scored in comparison with values obtained by a professional driver, and the total drive skill of the vehicle 1 is determined, thereby determining which of the three drive skill categories "HIGH", "MEDIUM", and "LOW" applies. For example, as illustrated in FIG. 5A, the accelerator skill value (A) is "HIGH" when the accelerator skill value is 90% or more of the accelerator skill value of the professional driver, "MEDIUM" when the accelerator skill value is 80% or more and less than 90%, and "LOW" when the accelerator skill value is less than 80%. The steering wheel operation skill value (B) and the brake skill value (C) are similarly determined. For example, when all of the accelerator skill value (A), the steering wheel operation skill value (B), and the brake skill value (C) are "HIGH", the total skill of the driver of the vehicle 1 is determined in the drive skill category "HIGH".

The drive skill category determiner 55 may change the determination reference of the drive skill category based on the road condition category determined by the road condition determiner 54. For example, when the road condition determiner 54 determines that the road condition category is "ICE" as illustrated in Part (i) of FIG. 5B, the drive skill category determiner 55 determines the steering wheel operation skill value (B) indicating the steering wheel operation skill at a curve as a priority skill value among the accelerator skill value (A), the steering wheel operation skill value (B), and the brake skill value (C). In the case where the steering wheel operation skill value (B) is determined as the priority skill value, the steering wheel operation skill value is "HIGH" when the steering wheel operation skill value is 98% or more of the steering wheel operation skill value of the professional driver with reference to FIG. 5A, "MEDIUM" when the steering wheel operation skill value is 90% or more and less than 98%, and "LOW" when the steering wheel operation skill value is less than 90%.

The priority skill value may be determined based on the road condition information acquired by the road condition detector 52. For example, as illustrated in Part (ii) of FIG. 5B, the priority skill value may be determined based on a friction coefficient that is the road condition information acquired by the road condition detector 52.

The drive skill determination by the drive skill category determiner 55 of this embodiment is not limited to the determination described above. Another known drive skill determination technology may be employed without departing from the gist of this embodiment. The drive skill determination is not limited to the determination using three levels (HIGH, MEDIUM, LOW), and may be made by using two levels (GOOD, POOR) or further subdivided levels.

The drive assist execution determiner 56 determines whether to execute the drive assist process for the vehicle 1 depending on the road condition category determined by the road condition determiner 54 and the drive skill category determined by the drive skill category determiner 55 based on the drive assist necessity information acquired by the drive assist necessity information acquirer 51.

For example, when the drive assist necessity information acquirer 51 acquires an intention of the driver of the vehicle 1 to permit the drive assist, the drive assist execution determiner 56 determines to execute the drive assist for the vehicle 1 depending on the road condition category determined by the road condition determiner 54 and the drive skill category determined by the drive skill category determiner 55. For example, the drive assist execution determiner 56 can determine details of the drive assist by referring to a drive assist database related to details of the drive assist as illustrated in FIG. 7.

FIG. 7 illustrates a database to be applied to set a driving force upper limit value as an example of the drive assist by the vehicle drive assist apparatus 100 of this embodiment. In FIG. 7, driving force upper limit values are set for each road condition under the assumption that the driving force of the vehicle 1 is 100% when the driving force upper limit value is not set. For example, when limiting the driving force as the drive assist for the vehicle 1, the driving force upper limit value associated with the road condition determination (for example, DRY) and the drive skill determination (for example, HIGH) is set to 90% by referring to the list of driving force upper limit values illustrated in FIG. 7. When the road condition determination changes from "DRY" to "SNOW" during the traveling of the vehicle 1, the drive assist execution determiner 56 can change the driving force upper limit value to 80% (driving force limitation) by referring again to the list of driving force upper limit values of FIG. 7 based on the changed road condition determination.

The drive assist may be reduced as the determined drive skill of the driver increases, and may be increased as the determined drive skill of the driver decreases. In other words, the limitation on the driving force of the vehicle may be reduced as the drive skill of the driver increases, and may be increased as the drive skill decreases. By changing the drive assist (including the driving force limitation) depending on the drive skill level of the driver, more appropriate drive assist can be provided for the vehicle depending on the drive skill of the driver. When the drive skill of the driver is low, the driving force limitation may be increased because a driving force beyond the road friction coefficient may cause slip. When the drive skill of the driver is high, the driving force limitation may relatively be reduced because a small driving force relative to the reaction force may give a feeling of insufficient acceleration to the driver.

Even if the drive assist necessity information acquirer 51 acquires intention information indicating that the driver of the vehicle 1 does not permit the drive assist, the drive assist execution determiner 56 may determine to execute the drive assist for the vehicle 1 based on the dangerous drive information of the vehicle 1 that is acquired by the drive assist necessity information acquirer 51. For example, when the driver's awareness level continues low for the predetermined period or longer or when the passenger's fear level continues high for the predetermined period or longer, the drive assist execution determiner 56 determines to execute the drive assist for the vehicle 1 based on the dangerous drive information acquired by the drive assist necessity information acquirer 51. When determination is made to execute the drive assist against the driver's intention, the driver may be notified about the determination result on the display or by voice and sound before the execution of the drive assist. The driver's dissatisfaction with the drive assist can be suppressed by recognizing the determination result in advance.

When the drive assist execution determiner 56 determines to execute the drive assist, the commander 57 outputs a determination signal to the vehicle control device 41. The vehicle control device 41 executes the drive assist for the vehicle 1 based on the input determination signal. Examples of the drive assist for the vehicle 1 include, but not limited to, limitation on the driving force of the vehicle 1 and increase or reduction in the driving force upper limit value.

The driving force of the vehicle is generally determined by "driving force (P)=engine torque (Te)×transmission gear ratio×final reduction ratio×transmission efficiency÷tire dynamic load radius". In this embodiment, the driving force of the vehicle 1 can be limited by, for example, adjusting the engine torque.

Figure 8:
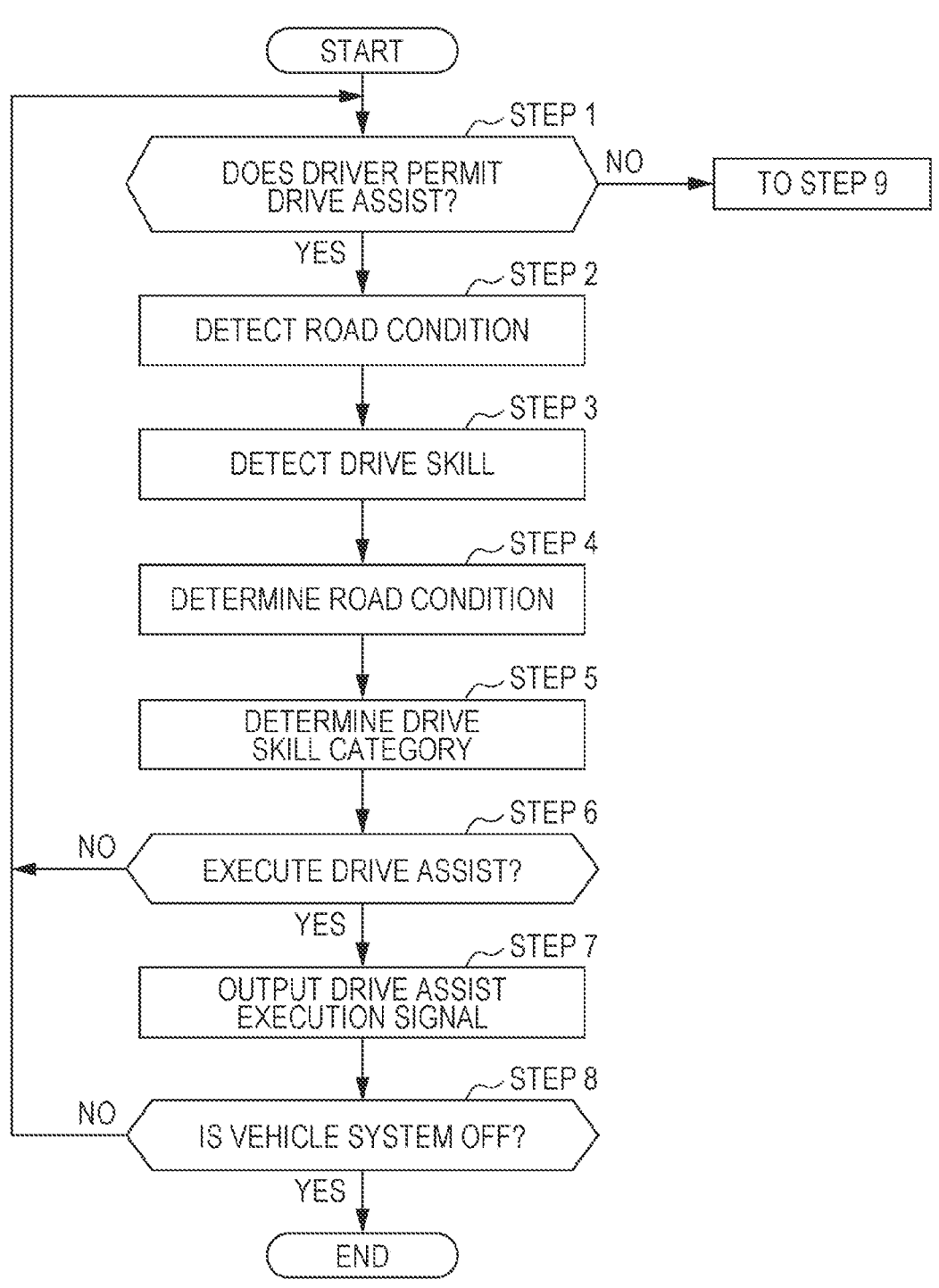
FIG. 8 is an exemplary flowchart of a drive assist method to be performed by the vehicle drive assist apparatus according to the embodiment.

A drive assist method to be performed by the vehicle drive assist apparatus 100 of this embodiment is described with reference to a flowchart of FIG. 8. The following vehicle drive assist is executed by the vehicle drive assist apparatus 100.

In Step 1, the drive assist necessity information acquirer 51 acquires information as to whether the drive assist for the vehicle 1 is necessary. For example, information indicating "drive assist: permitted" is generated when the driver inputs an intention on the display as to whether to permit the drive assist by the vehicle drive assist apparatus 100. The drive assist necessity information acquirer 51 acquires the generated information via the communicator such as the CAN or the LIN.

In Step 2, the road condition detector 52 detects information on conditions of a road where the vehicle 1 is traveling by using the surrounding environment sensor 31 and the like. For example, information such as a road temperature, road irregularities, and a road water amount is detected.

In Step 3, the drive skill detector 53 detects information on the drive skill of the driver of the vehicle 1 by using vehicle condition sensor 35 and the like. For example, the drive skill detector 53 detects information such as the accelerator skill value (A) indicating the accelerator depression skill, the steering wheel operation skill value (B) indicating the steering wheel operation skill of the driver of the vehicle at a curve, and the brake skill value (C) indicating the vehicle brake depression skill of the driver during the braking of the vehicle.

In Step 4, the road condition determiner 54 determines which of "ICE", "SNOW", "DRY", and "WET" applies to the road where the vehicle 1 is traveling based on the road condition information acquired by the road condition detector 52. For example, determination is made that the road condition during the traveling of the vehicle 1 is "DRY" based on the road condition information (road temperature, road irregularities, road water amount) by referring to the road condition categories 71 in the database 70.

In Step 5, the drive skill category determiner 55 determines which of the three drive skill categories "HIGH", "MEDIUM", and "LOW" applies based on the drive skill information acquired by the drive skill detector 53. For example, determination is made that the drive skill of the driver of the vehicle 1 is in the drive skill category "HIGH".

In Step 6, the drive assist execution determiner 56 determines whether to execute the drive assist based on the determination made by the road condition determiner 54 and the determination made by the drive skill category determiner 55. Since the vehicle 1 is traveling along the "DRY" road and the drive skill is "HIGH", the driving force upper limit value is determined based on the determinations by referring to the drive assist database illustrated in FIG. 7. In Step 7, the drive assist for the vehicle 1 is executed by outputting a signal to the vehicle control device 41 via the commander 57.

Figure 9:
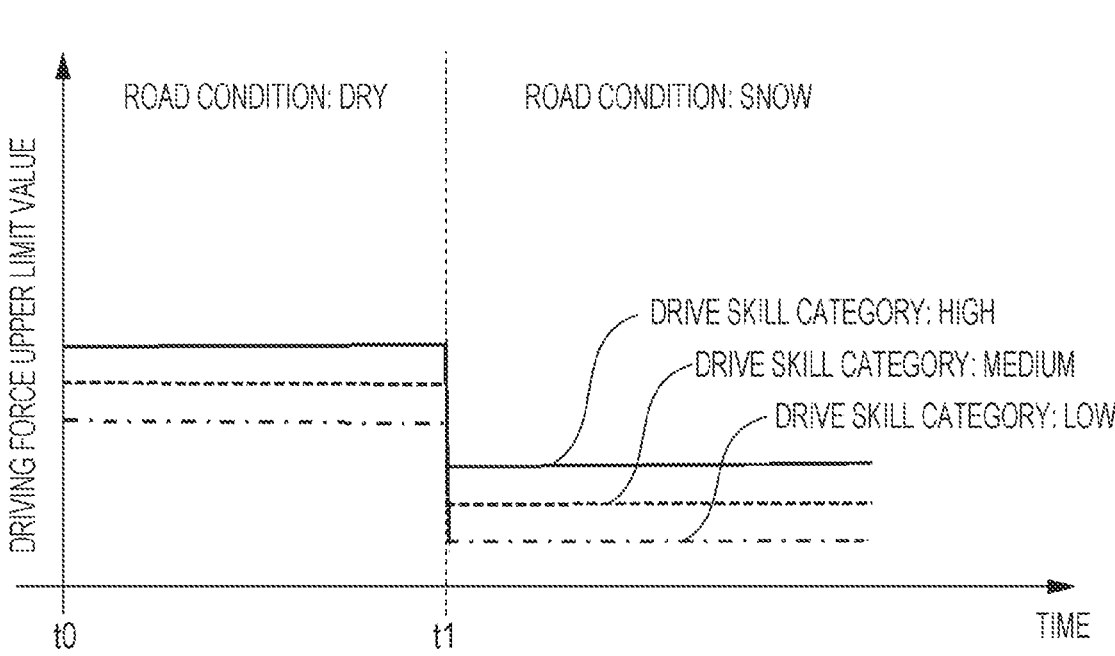
FIG. 9 is a schematic diagram illustrating an example of the drive assist to be performed by the vehicle drive assist apparatus according to the embodiment.

When determination is made in Step 8 that the vehicle system is OFF, the process is terminated. The process is repeated until the vehicle system becomes OFF. In this case, the road condition category determination may be updated based on the road condition information detected by the road condition detector. For example, as illustrated in FIG. 9, the road condition category is determined to be "DRY" at the start of the traveling of the vehicle 1, and is changed to "SNOW" after an elapse of t1 seconds from the start of the traveling. In this case, the drive assist execution determiner 56 can change the driving force upper limit value based on the updated information. For example, as illustrated in FIG. 9, the driving force upper limit value of the vehicle 1 can be reduced along with the traveling period or the traveling distance.

Figure 10:
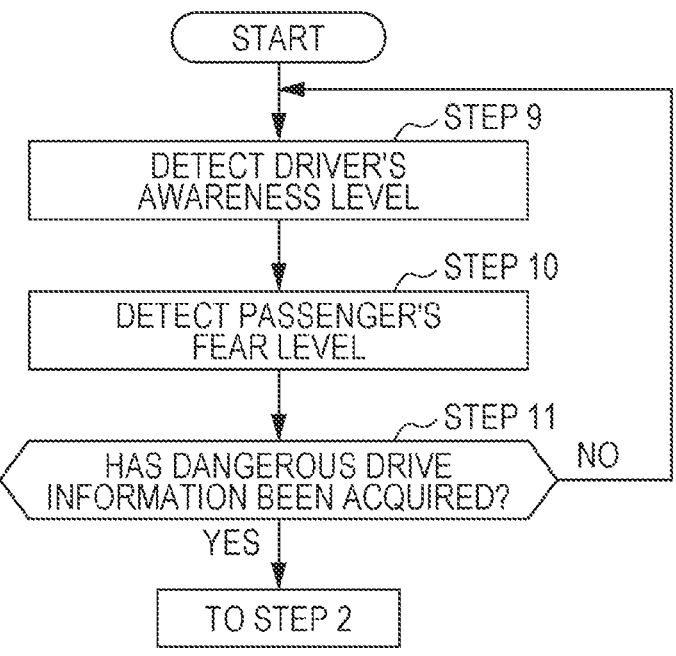
FIG. 10 is a flowchart of the acquisition of the dangerous drive information by the vehicle drive assist apparatus according to the embodiment.

Referring to Step 9 and subsequent steps in FIG. 10, description is made about a flow in a case where the drive assist necessity information acquirer 51 acquires, in Step 1, information indicating that the driver does not permit the drive assist by the vehicle drive assist apparatus 100.

When the drive assist necessity information acquirer 51 acquires the information indicating that the drive assist by the vehicle drive assist apparatus 100 is not permitted, the drive assist necessity information acquirer 51 acquires information as to whether the vehicle 1 is performing dangerous drive (dangerous drive information) as illustrated in FIG. 10. In Step 9, the drive assist necessity information acquirer 51 detects a driver's awareness level. In Step 10, the drive assist necessity information acquirer 51 detects a passenger's fear level. When the predetermined period or longer has elapsed after the parameter of the driver's awareness level or the passenger's fear level falls below the danger threshold, the dangerous drive information is generated, and is acquired by the drive assist necessity information acquirer 51 in Step 11. Then, the process continues by returning to Step 2 of FIG. 8.

When the predetermined period or longer has not elapsed after the parameter of the driver's awareness level or the passenger's fear level falls below the danger threshold, the dangerous drive information is not generated. Therefore, the process continues by returning to Step 9.

Figures 11A, 11B:
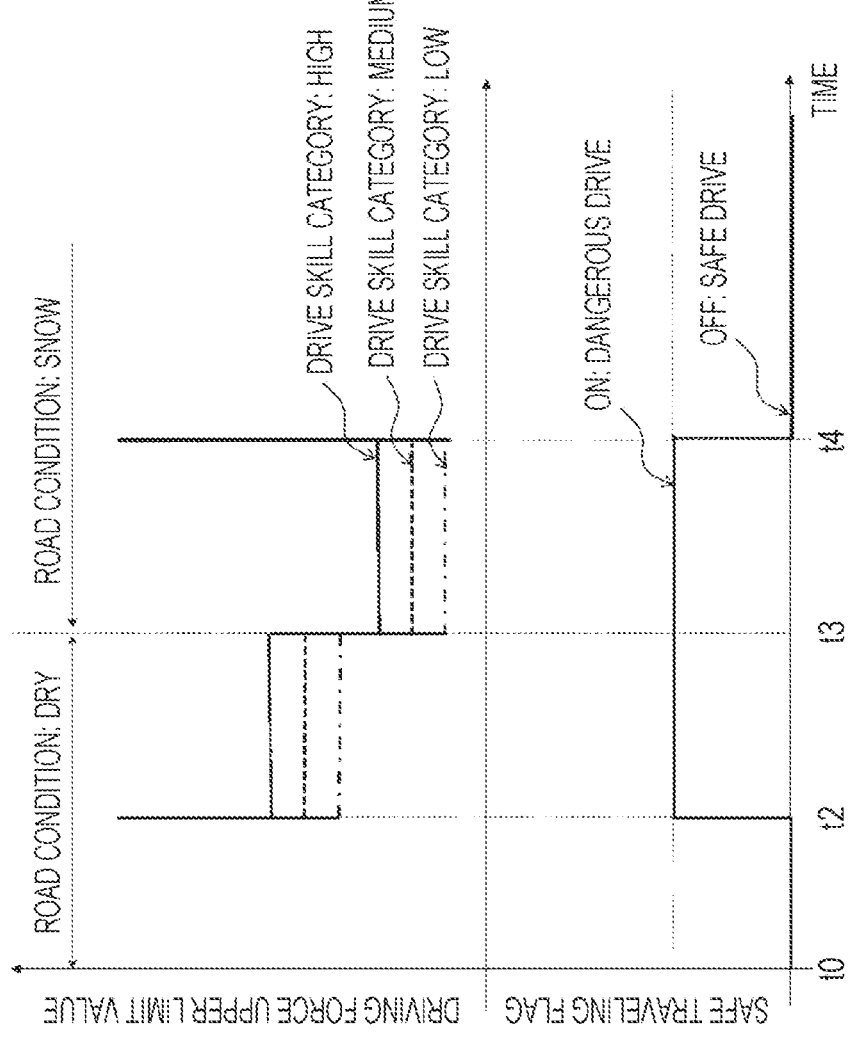
FIGS. 11A and 11B are time charts of the acquisition of the dangerous drive information by the vehicle drive assist apparatus according to the embodiment.

FIGS. 11A and 11B illustrate the flow of the drive assist process including Steps 9 to 11. FIG. 11A is a diagram illustrating the driving force limitation including Steps 9 to 11. FIG. 11B is a diagram illustrating the statuses of safe drive and dangerous drive in FIG. 11A. The following description is made in time sequence.

When the process proceeds to Step 9 and Step 10 after the information indicating that the driver does not permit the drive assist is acquired, the drive assist necessity information acquirer 51 has not acquired the dangerous drive information during a period in which a time T is t0 to t2 in FIG. 11A. Therefore, the drive assist is not executed, that is, the driving force upper limit value of the vehicle 1 is not set by the vehicle drive assist apparatus 100. When the time T is t2, the drive assist necessity information acquirer 51 acquires the dangerous drive information, and the driving force upper limit value of the vehicle 1 is set by referring to the list of driving force upper limit values illustrated in FIG. 7. When the time T is t3, the road condition determiner 54 changes the determination from "DRY" to "SNOW", and the driving force upper limit value of the vehicle 1 is changed (limited) by referring again to the list of driving force upper limit values illustrated in FIG. 7. When the time T is t4, the drive assist necessity information acquirer 51 does not acquire the dangerous drive information, and the driving force upper limit value of the vehicle 1 is canceled. The vehicle drive assist apparatus 100 repeats the drive assist method from Step 1.

According to the vehicle drive assist apparatus 100 for the vehicle 1 in this embodiment, more appropriate drive assist can be performed depending on the road condition and the drive characteristic and the drive skill of the driver.

Although the exemplary embodiment of the disclosure is described above with reference to the accompanying drawings, the embodiment of the disclosure is not limited to this embodiment. It is understood that further modifications may be attempted on the embodiment by persons having ordinary skill in the art and are included in the technical scope disclosed herein.

In the vehicle drive assist apparatus 100 of this embodiment, the driving force upper limit value is set or changed as the example of the drive assist for the vehicle 1. Examples of the drive assist for the vehicle 1 by the vehicle drive assist apparatus 100 include increase or reduction in an upper limit value or a lower limit value of the acceleration and deceleration of the vehicle 1, assist for the steering speed or the steering angle of the vehicle 1, assist for a brake pedal depression force or a braking force of the vehicle 1, assist related to VDC intervention for the vehicle 1, assist related to the strength of seat support of the vehicle 1, and coaching or suggestion of drive operation of the vehicle 1.

The drive assist method of the vehicle drive assist apparatus 100 includes the determination on the four road conditions "ICE", "SNOW", "DRY", and "WET" and the determination on the three drive skill categories "HIGH", "MEDIUM", and "LOW". As illustrated in FIG. 4, further detailed drive assist can be performed by using a road friction coefficient in the database including road friction coefficients ($\mu$ values) based on the road condition determination result and the drive skill determination result. Thus, more appropriate drive assist can be provided for the vehicle.

Some aspects of the disclosure are described below.

(1) A vehicle drive assist apparatus including one or more processors and one or more memories communicably coupled to the one or more processors, in which the one or more processors are configured to acquire road condition information of a road where a vehicle is traveling, drive skill information of a driver who drives the vehicle, and drive assist necessity information of the vehicle, determine which of preset road condition categories applies based on the acquired road condition information, acquire, in the acquired drive skill information, an accelerator skill value indicating an accelerator depression skill of the driver of the vehicle, a steering wheel operation skill value indicating a steering wheel operation skill of the driver of the vehicle at a curve, and a brake skill value indicating a vehicle brake depression skill of the driver during braking of the vehicle, determine a priority skill value among the accelerator skill value, the steering wheel operation skill value, and the brake skill value based on the acquired road condition information, determine which of preset drive skill categories applies based on the determined priority skill value, and execute a drive assist process for the vehicle depending on the determined road condition category and the determined drive skill category based on the acquired drive assist necessity information.

(2) The vehicle drive assist apparatus according to Item (1), in which the one or more processors are configured to, in a case where the road condition information is updated, execute the process based on the updated road condition information.

(3) The vehicle drive assist apparatus according to Item (1), in which the one or more processors are configured to acquire, in the acquired drive assist necessity information, dangerous drive information detected based on a state of an occupant of the vehicle, the dangerous drive information including one or more of driver's awareness level information indicating an awareness level of the driver and emotion information of an occupant in the vehicle other than the driver, and execute the drive assist process based on the acquired dangerous drive information.

(4) A computer program causing one or more processors to execute a process including:

acquiring road condition information of a road where a vehicle is traveling, drive skill information of a driver who drives the vehicle, and drive assist necessity information of the vehicle;

determining which of preset road condition categories applies based on the acquired road condition information;

determining which of preset drive skill categories applies based on the acquired drive skill information; and executing drive assist for the vehicle depending on the determined road condition category and the determined drive skill category based on the acquired drive assist necessity information.

(5) A recording medium storing a computer program causing one or more processors to execute a process including:

acquiring road condition information of a road where a vehicle is traveling, drive skill information of a driver who drives the vehicle, and drive assist necessity information of the vehicle;

determining which of preset road condition categories applies based on the acquired road condition information;

determining which of preset drive skill categories applies based on the acquired drive skill information; and executing drive assist for the vehicle depending on the determined road condition category and the determined drive skill category based on the acquired drive assist necessity information.

(6) A vehicle drive assist apparatus including:

a road condition detector configured to detect road condition information of a road where a vehicle is traveling;

a drive skill detector configured to detect drive skill information of a driver who drives the vehicle;

a drive assist necessity information acquirer configured to acquire drive assist necessity information of the vehicle;

a road condition determiner configured to determine which of preset road condition categories applies based on the acquired road condition information;

a drive skill category determiner configured to determine which of preset drive skill categories applies based on the acquired drive skill information; and a drive assist execution determiner configured to execute a drive assist process for the vehicle depending on the determined road condition category and the determined drive skill category based on the acquired drive assist necessity information.

(7) The vehicle drive assist apparatus according to Item (6), in which the drive skill detector is configured to acquire an accelerator skill value indicating an accelerator depression skill of the driver of the vehicle, a steering wheel operation skill value indicating a steering wheel operation skill of the driver of the vehicle at a curve, and a brake skill value indicating a vehicle brake depression skill of the driver during braking of the vehicle, and in which the drive skill category determiner is configured to determine a priority skill value among the accelerator skill value, the steering wheel operation skill value, and the brake skill value based on the acquired road condition information, and determine which of the preset drive skill categories applies based on the determined priority skill value.

(8) The vehicle drive assist apparatus according to Item (6), in which the drive assist execution determiner is configured to, in a case where the road condition information is updated, execute the drive assist process for the vehicle based on the updated road condition information.

(9) The vehicle drive assist apparatus according to Item (6), in which the drive assist necessity information acquirer is configured to acquire intention information related to drive assist permission of the driver of the vehicle, and in which the drive assist execution determiner is configured to execute the drive assist process based on the acquired intention information related to the drive assist permission.

(10) The vehicle drive assist apparatus according to Item (6), in which the drive assist necessity information acquirer is configured to acquire dangerous drive information detected based on a state of an occupant of the vehicle, and in which the drive assist execution determiner is configured to execute the drive assist process based on the acquired dangerous drive information.

(11) The vehicle drive assist apparatus according to Item (10), in which the dangerous drive information includes one or more of driver's awareness level information indicating an awareness level of the driver and emotion information of an occupant in the vehicle other than the driver.

The controller 50 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 50 including the drive assist necessity information acquirer 51, the road condition detector 52, the drive skill detector 53, the road condition determiner 54, the drive skill category determiner 55, the drive assist execution determiner 56, and the commander 57. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle drive assist apparatus comprising:

one or more processors; and one or more memories communicably coupled to the one or more processors, wherein the one or more processors are configured to:

execute a drive assist process to control a drive source of a vehicle such that a drive force generated by the drive source does not exceed an upper limit value that is smaller than a predetermined first value;

acquire, from a human-machine interface of the vehicle, intention information indicating whether a driver who drives the vehicle permits an execution of the drive assist process;

acquire road condition information of a road where the vehicle is traveling from a surrounding environment sensor, the road condition information including road temperature information, road irregularity information, and road water amount information;

acquire vehicle condition information from a vehicle condition sensor, the vehicle condition information indicating an accelerator operation amount of the vehicle, a steering angle of the vehicle, and a brake operation amount of the vehicle;

calculate, based on the vehicle condition information, drive skill information of the driver, including (i) an accelerator skill value, (ii) a steering wheel operation skill value, and (iii) a brake skill value;

determine which of preset road condition categories applies by comparing the road temperature information, the road irregularity information, and the road water amount information with matrix data stored in the one or more memories;

determine, based on the determined road condition category, a priority skill value among the accelerator skill value, the steering wheel operation skill value, and the brake skill value;

determine which of preset drive skill categories applies based on the determined priority skill value;

wherein the upper limit value is determined based on the determined road condition category and the determined drive skill category, wherein each preset road condition category is associated with a road condition having a different friction coefficient, each preset drive skill category is associated with a different degree of drive skill, the upper limit value becomes smaller as the friction coefficient associated with the determined road condition category becomes smaller, and the upper limit value becomes smaller as the degree of drive skill associated with the determined drive skill category becomes lower;

acquire fear level information indicating a fear level of an occupant of the vehicle, excluding the driver, from a biometric sensor of the vehicle;

when a fear level indicated by the acquired fear level information exceeds a predetermined second value for a predetermined period or longer, generate dangerous drive information;

in response to generating the dangerous drive information, execute the drive assist process regardless of an indication of the acquired intention information, thereby reducing the drive force generated by the drive source to or below the upper limit value;

when the one or more processors do not generate the dangerous drive information and the intention information indicates that the driver permits the execution of the drive assist process, execute the drive assist process, thereby reducing the drive force generated by the drive source to or below the upper limit value; and when the one or more processors do not generate the dangerous drive information and the intention information does not indicate that the driver permits the execution of the drive assist process, do not execute the drive assist process to allow the drive force generated by the drive source to exceed the upper limit value.

2. The vehicle drive assist apparatus according to claim 1, wherein the preset road condition categories comprise DRY, WET, SNOW, and ICE.

3. The vehicle drive assist apparatus according to claim 1, wherein the preset drive skill categories comprise HIGH, MEDIUM, and LOW.

4. The vehicle drive assist apparatus according to claim 1, wherein the matrix data defines a relationship among the road temperature information, the road irregularity information, and the road water amount information to classify the road condition information into the preset road condition categories.

5. The vehicle drive assist apparatus according to claim 2, wherein determining the priority skill value comprises selecting:

(i) the brake skill value as the priority skill value when the determined road condition category is WET, (ii) the steering wheel operation skill value as the priority skill value when the determined road condition category is ICE, (iii) the accelerator skill value as the priority skill value when the determined road condition category is SNOW, and (iv) none of the accelerator skill value, the steering wheel operation skill value, and the brake skill value as the priority skill value when the determined road condition category is DRY.

6. The vehicle drive assist apparatus according to claim 1, wherein the biometric sensor acquires biometric information including at least a heart rate of the occupant excluding the driver, and wherein the fear level is derived from the acquired biometric information.

* * * * *